United States Patent Office.

JOSEPH KOETSCHET, OF ST. FONS, FRANCE, ASSIGNOR TO LA SOCIÉTÉ CHIMIQUE DES USINES DU RHÔNE, ANCIENNEMENT GILLIARD, P. MONNET ET CARTIER, OF LYONS, FRANCE.

PROCESS OF MAKING TOLUENE SULFOCHLORID.

SPECIFICATION forming part of Letters Patent No. 648,568, dated May 1, 1900.

Application filed December 4, 1899. Serial No. 739,082. (No specimens.)

*To all whom it may concern:*

Be it known that I, JOSEPH KOETSCHET, a citizen of the Swiss Republic, residing at St. Fons, near Lyons, France, have invented certain new and useful Improvements in the Production of Toluene Sulfochlorids, of which the following is a specification.

This invention has reference to the production of toluene sulfochlorids, and is more particularly applicable in the saccharin manufacture, at one point of which manufacture, as is well known, toluene sulfochlorids are produced.

Various methods have been described and used for the production of toluene sulfochlorids. According to one method the liquid toluene sulfochlorid, which is required for the manufacture of saccharin, has been prepared by introducing toluene slowly into a large excess of chlorosulfonic acid with constant stirring, the temperature never being allowed to rise beyond 5° centigrade. The mixture has then been stirred until the reaction is complete, this taking, as a rule, about twelve hours, the temperature being still maintained below 5° centigrade. The toluene sulfochlorid required for the manufacture of saccharin is then separated from the resulting mixture by submission to low temperatures.

It has hitherto been regarded as an essential in carrying out the process above described that the temperature should never exceed 5° centigrade. Now I have discovered that if particular care is taken to exclude free sulfuric anhydride from the chlorosulfonic acid—which may be done, for instance, by redistilling technical chlorosulfonic acid—a higher temperature may be employed with advantage, since not only is a better yield of sulfochlorids obtained, but there is a saving in the large expenditure for ice and salt required to maintain the lower temperature. According to my invention toluene is therefore made to react with chlorosulfonic acid free from sulfuric anhydride in large excess at a temperature of between 5° centigrade and 35° centigrade, whereby a much larger yield of sulfochlorids, and particularly of liquid sulfochlorid suitable for the manufacture of saccharin, is obtained than when the temperature is not allowed to exceed 5° centigrade. The best effect is obtained by causing toluene to run with constant stirring into from three to five times its weight of chlorosulfonic acid free from sulfuric anhydride. The toluene should be introduced little by little, but rapidly, the temperature throughout being maintained at about 10° centigrade. In no case should the temperature be allowed to exceed 35° centigrade.

If it be desired to separate the sulfochlorid used in the manufacture of saccharin, this can be effected in the known way, the mixture being poured upon ice as soon as the toluene is all introduced.

What I claim, and desire to secure by Letters Patent, is—

1. The method or process of producing toluene sulfochlorids, which consists in causing toluene to react with a large excess of chlorosulfonic acid free from sulfuric anhydride, the temperature during the reaction being maintained at between 5° centigrade and 35° centigrade, substantially as described.

2. The method or process of producing toluene sulfochlorids, which consists in causing toluene to react with three or more parts by weight of chlorosulfonic acid free from sulfuric anhydride, the temperature during the reaction being maintained at about 10° centigrade, substantially as described.

In witness whereof I have hereunto signed my name in the presence of two subscribing witnesses.

JOSEPH KOETSCHET.

Witnesses:
  THOS. N. BROWNE,
  MARION VACHON.